United States Patent [19]

Hecht et al.

[11] Patent Number: 5,515,053
[45] Date of Patent: May 7, 1996

[54] TRANSPONDER AND DATA COMMUNICATIONS SYSTEM

[75] Inventors: Johannes Hecht, Neu-Ulm; Andreas Peters, Ulm, both of Germany

[73] Assignee: Licentia Patent-Verwaltlungs-GmbH, Frankfurt am Main, Germany

[21] Appl. No.: 333,974

[22] Filed: Nov. 3, 1994

[30] Foreign Application Priority Data

Nov. 4, 1993 [DE] Germany .................... 43 37 637.1

[51] Int. Cl.⁶ ............................................... G01S 13/80
[52] U.S. Cl. ........................... 342/42; 342/44; 342/50; 340/905; 340/991; 340/568
[58] Field of Search ........................... 342/42, 44, 50, 342/51; 340/905, 991, 425.5, 568

[56] References Cited

U.S. PATENT DOCUMENTS 3,860,922  1/1975  Wagner ................................ 342/42
3,970,824  7/1976  Walton et al. ....................... 342/42
5,164,985  11/1992  Nysen et al. ........................ 380/9
5,410,315  4/1995  Huber ................................... 342/42

OTHER PUBLICATIONS

German publication "Trovan Electronic Identification System".

Primary Examiner—J. Woodrow Eldred
Attorney, Agent, or Firm—McGlew and Tuttle

[57] ABSTRACT

A transponder as well as a data communications system equipped with such a transponder are described, with which identification and/or individual addressing of the simultaneously present transponders is guaranteed in a simple manner even in the case of the simultaneous presence of a plurality of transponders in the field range of the reader.

11 Claims, 3 Drawing Sheets

TRANSPONDER AND DATA COMMUNICATIONS SYSTEM

FIELD OF THE INVENTION

The present invention pertains to a transponder with a receiving and transmitting antenna which can interact with a reader by means of electromagnetic fields and particularly a transponder which can receive and/or transmit information to a data communications system with such transponders.

BACKGROUND OF THE INVENTION

Such a transponder with the corresponding reader interrogator was described in, e.g., the prospectus Elektronische Identifikation System Trovan [Trovan Electronic Identification System] of the firm AEG Aktiengesellschaft, Ulm, of June 1992. The transponder described there has a fixed-code memory as the useful memory. If the transponder is located in the field range of the reader, it is prompted to transmit the contents of its useful memory, as a result of which it is identifiable for the reader.

In the case of applications in which a plurality of transponders may be simultaneously in the field range of the reader, this simple arrangement does not operate with sufficient reliability, because the signals of a plurality of transponders transmitting simultaneously cannot be, in general, separated and evaluated, at least not without substantial extra cost.

SUMMARY AND OBJECTS OF THE INVENTION

Therefore, the object of the present invention is to provide a transponder and a data communications system for reliable contactless data communication even in cases in which more than one transponder is located in the field range of the reader.

According to the invention, a transponder is provided with a receiving and transmitting antenna which can interact with a reader by means of electromagnetic fields and particularly a transponder which can receive and/or transmit information. The transponder is provided with a code memory in which a multi-position transponder code is stored. A comparator in the transponder compares a multi-position call code received via the electromagnetic fields with a stored transponder code. The comparator triggers a predetermined function of the transponder when the call code, in a predetermined checking section of the codes, has the same values as the stored transponder code or specified substitute values.

The triggering function includes the transmission of a piece of information stored in a useful memory of the transponder. The triggered function is formed of changing information contained in a useful memory of the transponder. The triggered function may be the setting of a checking section. The useful memory and the code memory may be identical.

The invention further provides a data communication system, including a first interrogation step wherein the reader transmits a first call code which contains more substitute values than an individualizing complete call code. A response signal that may consequently be received is checked by the reader to determine whether a) a response signal contains information from a plurality of transponders, after which a call code is transmitted which contains fewer substitute values than the preceding call code, and the response signals are again checked; and b) the response signal contains information from only one transponder, after which a measure which may have been intended for the transponder identified is triggered. The data communication system may be provided such that the first call code contains only substitute values.

Contrary to the simple transponder system according to the above-mentioned prospectus, the transponder according to the present invention waits for a prompt by a modulated electromagnetic field, whose modulation information contains at least one call code. Additional information in the modulated field of the reader is reliable. The extraction of the information from the field modulation is well known to the person skilled in the art.

When a reader is hereinafter mentioned, it shall not be limited to the function of reception of a signal by this device, but it generally comprises the bidirectional exchange of data between a transponder and the reader (reader/interrogator), and it also includes a change in the memory contents of the transponder by a signal transmitted from the reader.

It is assumed that, in principle, each transponder can be positively identified by its complete transponder code, and thus it can be addressed solely by a reader signal with a call code which is completely identical to this transponder code. The checking whether a specific individual transponder is located in the active antenna field (field range) can thus be performed simply by a call code which is completely identical to the transponder code.

In contrast, transponders are usually used to attempt to identify a priori unknown transponders. The above-described problems arise when a plurality of transponders are simultaneously present in the field range of the reader.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
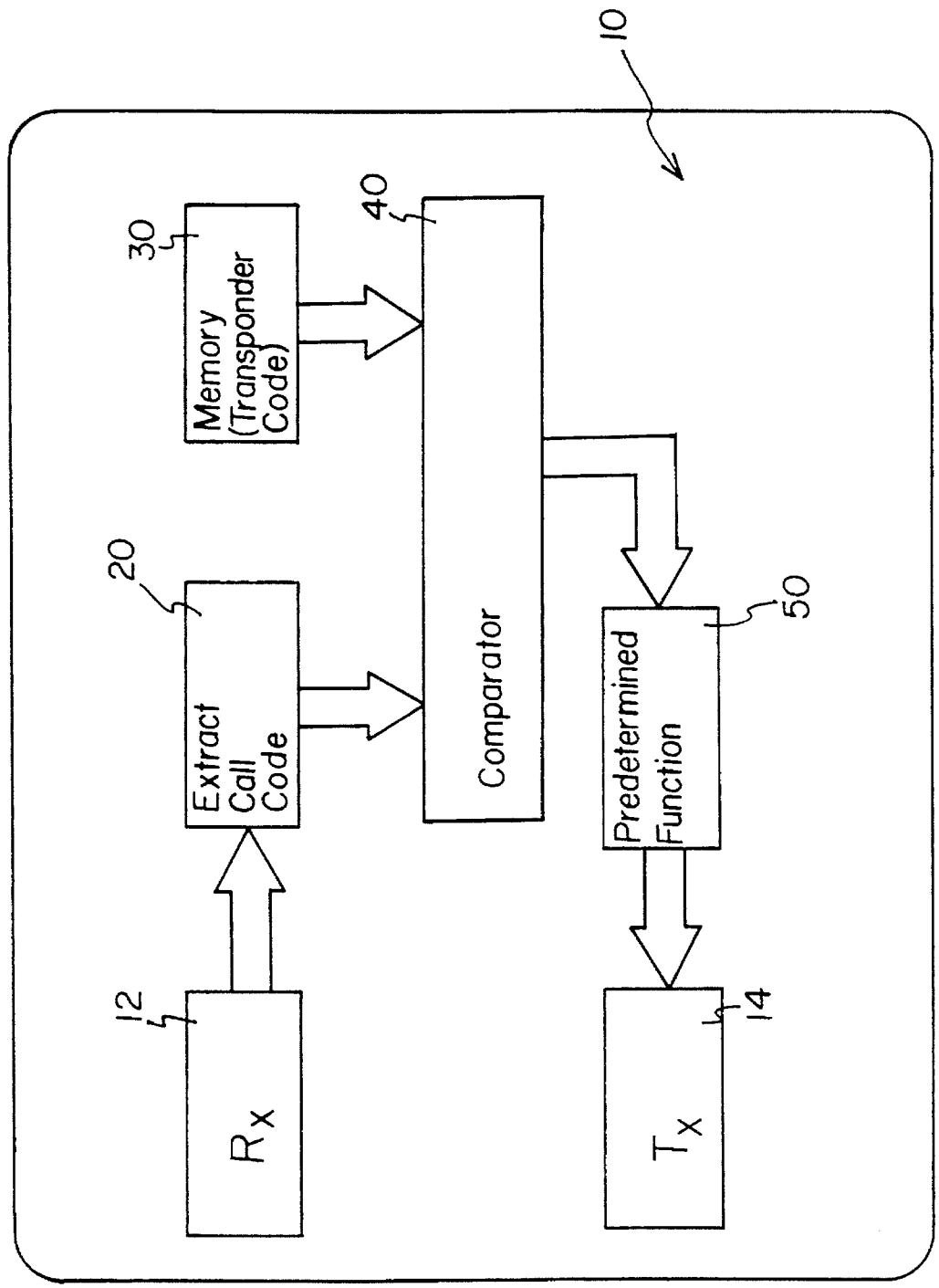
FIG. 1 is a schematic diagram of the transponder for the data communication system, according to the invention.
Figure 2:
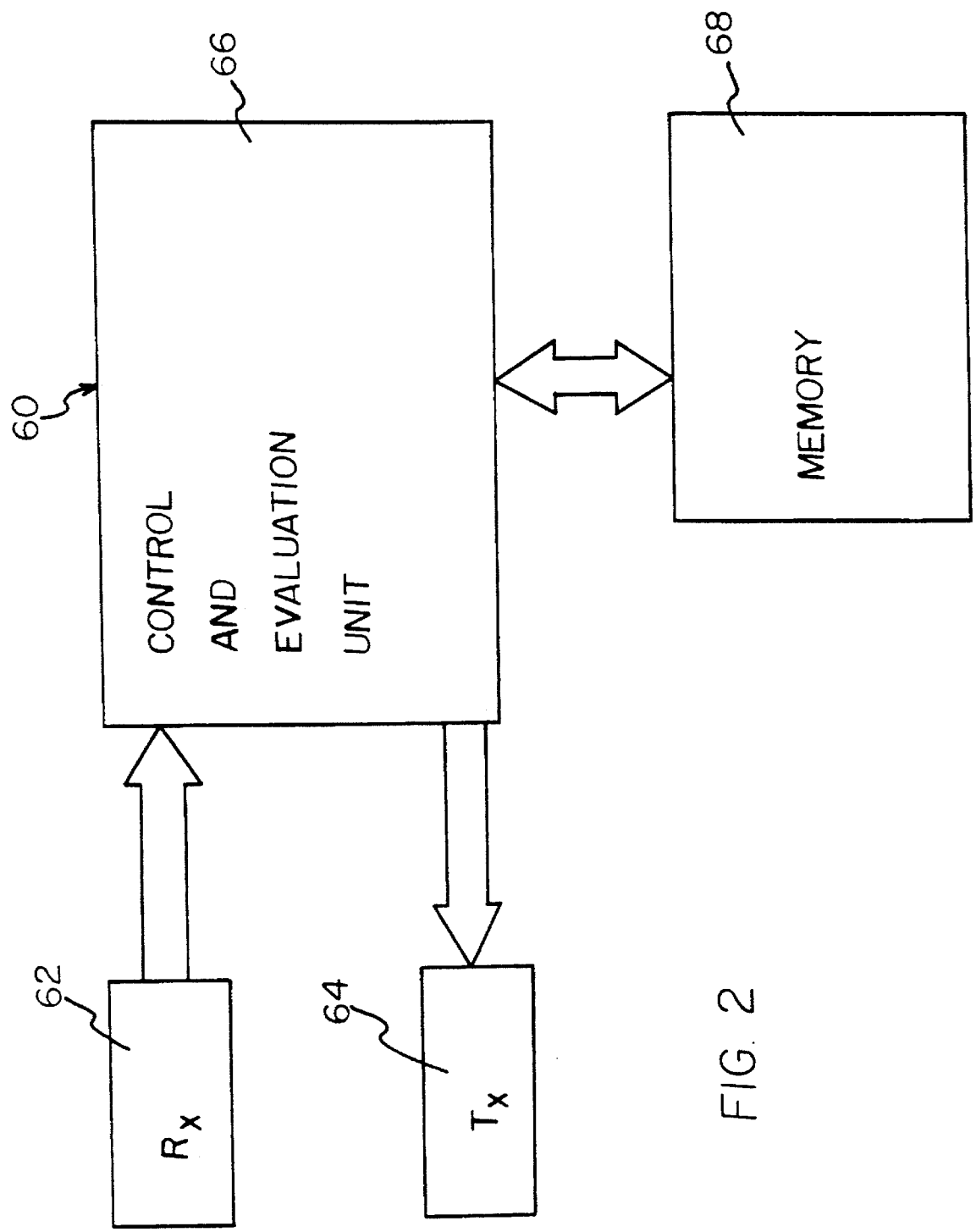
FIG. 2 is a schematic diagram showing the interrogator used in the data communication system according to the invention.

The transponder according to the present invention makes possible an interrogation strategy, with which this problem is reliably solved in a simple manner. The essential feature of the present invention is that at least one value is reserved as a substitute value (joker value or wild card value) among the values permissible for the occupation of the individual positions of the transponder code and of the call code, and this substitute value can replace each of the other permissible values, which are hereinafter called characteristic values, during the comparison of the code. Together, a plurality of modulation steps of a signal may be considered to be positions of a code; for example, if three steps of a binarily modulated signal are considered blockwise as one code position, eight permissible values are obtained for a code position, represented by, e.g., the numbers 0 through 7, where, e.g., "0" is reserved as a substitute value, so that seven permissible characteristic values "1" through "7" are available. (Different approaches to forming positions from modulation steps can be converted into each other, and they can always be reduced to the binary representation; the position definition was selected only for the sake of better understanding.) The substitute value may occur in both the call code and the stored transponder code.

The call code recovered from the received signal in the transponder may have, in any position, one of the characteristic values or the substitute value. The comparator checks the call code and the transponder code in all positions of a fixed or variable predeterminable checking section for agreement in certain positions, and agreement is also determined when a substitute value and any characteristic value oppose each other. The checking section may extend over the entire length of the transponder code, or it may comprise only part of this length, preferably including the beginning of the code in this case.

A call code containing one substitute value or a plurality of substitute value can thus simultaneously address a plurality of transponders from a set defined by the length of the code, but this would lead, according to the statement of the problem, to a mixture of response signals, which would not be able to be directly evaluated.. The present invention uses information about the correlated nature or the uncorrelated nature of the codes of transponders that may be simultaneously located in the field range of the reader. Thus, a single characteristic value, besides only substitute values, in the call code may be sufficient in the case of completely uncorrelated transponder codes to individually address transponders from a small number of transponders, e.g., during the sorting of packages according to destinations in a receiving office, when the destination code is part of the transponder code. On the other hand, there can be a high correlation when, e.g., a group of packages is to be checked for the presence of a misdirected package during the air transport of packages. It is advantageous in this case to check out the generally small number of possible incorrect destination codes in call codes, which otherwise contain only substitute values. A predeterminable function, especially the transmission of the contents of a useful memory, is triggered if agreement between the call code and the transponder code is determined.

It is advantageous for an effective strategy for the identification or group assignment of a previously unknown transponder to use a call code of high ambiguity, i.e., a call code having only a few characteristic values, in a first step. In an extreme case, such a first call code may consist exclusively of substitute values, which is advantageous especially when the case of the simultaneous occurrence of a plurality of transponders in the field range can be expected only rarely. A call code containing only substitute values is now comparable to a non-modulated field of the reader. Instead of a call code containing only substitute values, it is therefore also possible to emit a nonmodulated field from the reader as the first interrogation signal. If a received signal which is not evaluable due to the superimposition of a plurality of transponder signals arrives at the reader in the case of such a call code, the ambiguity of the call code is used in a next step by the new call code containing, e.g., additional characteristic values or characteristic values in other code positions.

The received signal of the reader is again checked to determine whether
a) a plurality of transponder signals are contained; if yes, the ambiguity is further reduced;
b) only one transponder response signal is contained; if yes, it is evaluated, and the alternative call codes of equal ambiguity are subsequently checked; and
c) no transponder response signal occurs; if so, the alternative call codes of equal ambiguity are checked.

The function triggered in the case of agreement between the call code and the transponder code consists of, e.g., transmitting the contents of a useful memory or part of these contents as a response signal, as was assumed in the example described above. The contents of the useful memory may be completely or partially identical to the transponder code, and the code memory and the useful memory may be identical. Another basic function, which can be triggered in the case of agreement between the call code and the transponder code, is the release of the evaluation of the subsequent information of the interrogation signal of the reader, e.g., by interpretation of the subsequent information as an instruction to be carried out. Furthermore, it is also possible to set the length or the position of another checking section within the code length. Changing the contents of the code and/or useful memories in the transponder is another significant function.

If functions other than the transmission of memory contents from the transponder to the reader is to be intentionally triggered, it is advantageous to identify or to classify the transponder in the field range in order to intentionally coordinate the further functions with the detected transponder.

A data exchange system consists of at least one reader with the control and evaluation devices corresponding to the above specification, especially devices for inserting substitute words in call codes, and devices for assessing and evaluating transponder response signals, as well as at least one transponder.

The details of the technical design of the transponder and reader are partially known from the above-mentioned prospectus, and they are also well known to the person skilled in the art based on the instructions given.

Referring to FIG. 1 in particular, the transponder 10, according to the invention, includes a receiver 12 and a transmitter 14. The receiver 12 is connected to a mechanism for extracting code information from the field modulation. The extracting call code structure 20 is generally known in the art. The extracted code is compared at a comparator 40 with a code signal which is taken from the code memory 30 of the transponder 10. The comparator 40 compares a code stored in memory with the extracted code. However, according to the invention, the comparator 40 recognizes wild card values (joker values) referred to herein as "substitute values". These substitute values, such as 0 given in the example above ( or * in the example of FIG. 3), are known by the transponder. For example, if the value of 0 is a substitute value for a two-bit code, the extracted code 00 will match any code in the transducer memory 30. Accordingly, the two-bit code 00 will correspond to a stored code such as 11, 17, 99, etc. Similarly, if a two-bit code is used according to the system of the invention (obviously the code may have any bit value which is convenient) upon extracting the code 01 (wherein 0 is a substitute value), the comparator will detect a match for a code stored memory, such as 11, 21, 31 . . . 91, etc. When the comparator detects a match, either based on characteristic values (such as values 1 through 7, as described above) more substitute values or combinations thereof, the transducer than can output or transmit a signal such as a code signal stored in memory 50. As mentioned above, this code signal can be the same code stored in memory 30 and a single memory 30 can be used according to the invention.

A signal transmitted by the transponder is received by the interrogator 60 at the receiver 62. The interrogator also includes a transmitter 64 a control and evaluation unit 66 and optionally a memory 68. A read and write memory 68 is provided according to the preferred embodiment disclosed.

The interrogator 60 may receive no response to its originally-transmitted call code or it may receive one response from a transponder such as 10 or several responses (many responses).

Figure 3:
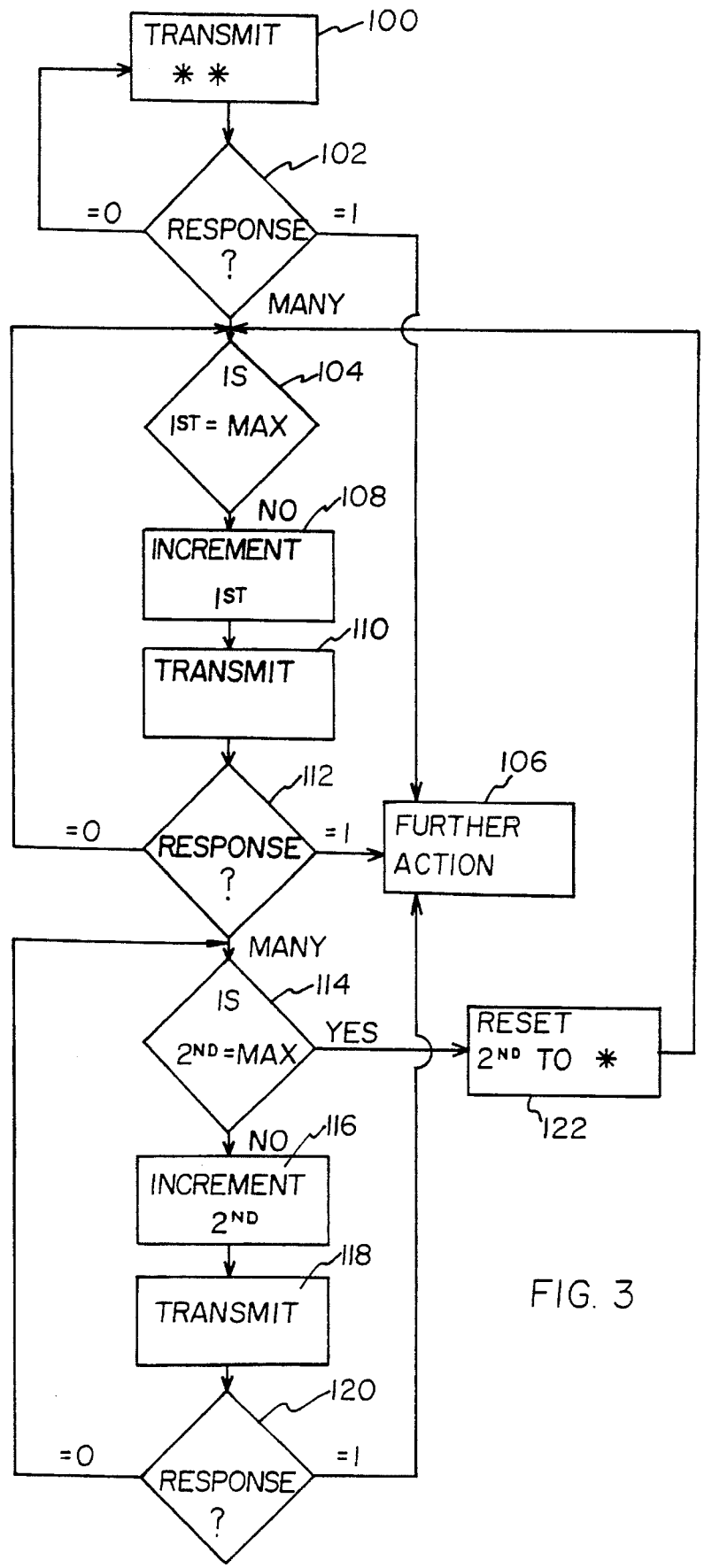
FIG. 3 is a diagram showing an algorithm according to the invention.

According to the invention, as illustrated in FIG. 3, the interrogator preferably first transmits all substitute values. The code may include several bits. However, for simplicity sake, a transponder/calling code based on a two-bit code is disclosed with reference to FIG. 3 for simplicity sake.

As shown in FIG. 3, the interrogator 60 transmits substitute values as shown at step 100. The substitute values are depicted in FIG. 3 as "" wherein  are wild card or joker values and values 0 through 9 are characteristic values. After transmitting the signal at transmitter 64, the receiver 62 waits for a response. Depending upon the transponders which are pleasant, the response 102 is either in the form of many (more than one) transmissions from various transponders or no transmission if no transponders are present or one transponder. In the case where only one transponder is present, a further function according to the state of art may occur, such as sending a new page or code to change the identity of the transponder or any other further action 106. If no response is received based on the transmitted substitute values, the interrogator is provided with the information that no transponders are present. The transmission 100 may be repeated. If many transponders provide a response, the interrogator may proceed to add characteristic values (such as numerals 1-7) to bit locations in the code in order to detect the identity of all transponders present or in order to detect transponders which are present falling into certain categories. Although a two-bit code is disclosed for simplicity sake, a many-bit code can be used wherein the interrogator can analyze one bit location or take other steps to receive information on the identity of the transponders present.

One simple means of obtaining the identity of all transponders is by sending a series of transmissions and incrementing the bit value after the original substitute values are set. For example, as shown in FIG. 3, if many transponders 10 respond to the original transmission of substitute values, the transmitted value is checked to see if the 1st digit is the maximum at step 104. If not, the first value may be incremented as shown at 108. The interrogator 60 can make a new transmission 110 based on a first value such as 1 (incremented from 0 or 0 incremented from *) and a second value which is still the substitute value. Responses are then considered at 112 wherein if only one response is received, further functions can be performed as noted at 106. If the response 112 is equal to 0 the interrogator 60 incrementally changes the transmitted value, and retransmits the calling code at 110. A response is then considered at 112 wherein if only one transponder responds, further functions can take place as noted at 106. If many responses are received (greater than 1), the interrogator 60, checks the second digit to determine if it is the maximum at 114. If it is not the maximum, the interrogator 60 incrementally changes the value as noted at 116 and transmits as noted at step 118. New calling codes with different 2nd digits are transmitted, and the response is evaluated at 120 until the second digit is the maximum. When this occurs the 2nd digit is changed back to a wild card at step 122 and the 1st digit is incremented at step 108 and subsequent combinations with second digits are considered at 120 until all calling codes have been checked.

Similar algorithms can be provided in order to consider every possible critical value from, for example 11 to 99. The algorithm of FIG. 3 is merely meant to explain the basic principals according to the invention.

While a specific embodiment of the invention has been shown and described in detail to illustrate the application of the principles of the invention, it will be understood that the invention may be embodied otherwise without departing from such principles.

What is claimed is:

1. A transponder with a receiver and transmitter for interacting with an interrogator by means of electromagnetic fields for receiving and/or transmitting information, comprising:

a transponder containing a code memory, said code memory storing a multi-position transponder code;

transponder comparator means for comparing each position of a multi-position call code received via electromagnetic fields with each corresponding position of the stored multiposition transponder code, said comparing resulting in a match in the value of a call code position and a corresponding transponder code position when the value is identical and resulting in a match in the value of a call code portion and a corresponding transponder code position when the value of the call code is a predetermined substitute value, said call code having at least one position with said predetermined substitute value; and a transponder function element connected to said comparator, said function element being triggered by said comparator when each position of said multiposition call code match a corresponding position of said stored transponder code.

2. Transponder according to claim 1, wherein said function includes transmission of information stored in said useful memory of said transponder.

3. Transponder according to claim 1, wherein said function includes transmitting information stored in said memory of said transponder.

4. Transponder according to claim 1, wherein said function includes setting a checking section.

5. Transponder according to claim 2, wherein said useful memory and said code memory are identical.

6. Data communication system, comprising:

an interrogator including means for transmitting a multi position first call code which has at least one position with a substitute value, said substitute values designating any value for a position of an individual multi position call code; and means for receiving a response signal and means for evaluating a response signal including checking the response signal to determine:

a) the response signal contains information from a plurality of transponders, after which a new call code is transmitted, which contains fewer substitute values than the preceding call code, and the response signal is again checked, b) the response signal contains information from only one transponder, after which a measure that may have been intended for the transponder identified is triggered.

7. Data communications system in accordance with claim 6, wherein said first call code contains only substitute values.

8. A transponder according to claim 1, wherein said call code includes at least one substitute value.

9. A transponder according to claim 1, wherein said call code includes at least two substitute values.

10. A transponder according to claim 1, wherein said call code includes only substitute values.

11. A data communications system according to claim 6, further comprising a transponder containing a code memory, said code memory storing a multi-position transponder code;

transponder comparator means for comparing each position of said multi-position first call code received via electromagnetic fields with each corresponding position of the stored multiposition transponder code, said comparing resulting in a match in the value of a call code position and a corresponding transponder code position when the value is identical and resulting in a match in the value of a call code portion and a corresponding transponder code position when the value of the call code is a predetermined substitute value, said call code having at least one position with said predetermined substitute value; and a transponder function element connected to said comparator, said function element being triggered by said comparator when each position of said multiposition call code match a corresponding position of said stored transponder code.

* * * * *